(12) United States Patent
Gabriel et al.

(10) Patent No.: US 7,784,413 B2
(45) Date of Patent: Aug. 31, 2010

(54) RACK SYSTEM FOR HOUSING ANIMALS IN CAGES HAVING DIFFERENT WIDTHS

(75) Inventors: George S. Gabriel, Seaford, MD (US); Neil E. Campbell, Eden, MD (US); Dale Murray, Elkton, MD (US); Rodney Gerringer, Belcamp, MD (US); Lynn Irwin, Seaford, DE (US); Bill Crites, Baltimore, MD (US)

(73) Assignee: Lab Products, Inc., Seaford, DE (US)

( * ) Notice: Subject to any disclaimer, the term of this patent is extended or adjusted under 35 U.S.C. 154(b) by 358 days.

(21) Appl. No.: 11/250,842

(22) Filed: Oct. 14, 2005

(65) Prior Publication Data

US 2006/0236951 A1    Oct. 26, 2006

Related U.S. Application Data

(60) Provisional application No. 60/619,249, filed on Oct. 15, 2004.

(51) Int. Cl.
*A47B 57/00* (2006.01)
(52) U.S. Cl. ...................................................... 108/60
(58) Field of Classification Search ................. 211/150, 211/151, 153, 162, 189, 286, 134, 187, 175, 211/190, 168, 169; 108/60, 61, 106, 107, 108/108, 180, 181, 186
See application file for complete search history.

(56) References Cited

U.S. PATENT DOCUMENTS

| | | | | |
|---|---|---|---|---|
| 4,270,661 A * | 6/1981 | Rosenband | ................. | 211/59.2 |
| 4,407,476 A * | 10/1983 | Bohannan | ................... | 248/235 |
| 4,955,490 A * | 9/1990 | Schafer | ...................... | 211/187 |
| D312,936 S * | 12/1990 | Lim | ............................ | D6/552 |
| 4,974,523 A * | 12/1990 | Giarratana | ................... | 108/42 |
| 5,279,431 A * | 1/1994 | Highsmith et al. | .......... | 211/189 |
| 5,628,415 A * | 5/1997 | Mulholland | ................. | 211/189 |
| 5,681,034 A * | 10/1997 | Noniewicz | ................... | 269/139 |
| 6,039,192 A * | 3/2000 | Hollander | .................... | 211/186 |
| 6,352,164 B1* | 3/2002 | Hyatte et al. | ................. | 211/192 |
| 6,705,477 B1* | 3/2004 | Narkis et al. | ................. | 211/153 |
| 2003/0066811 A1* | 4/2003 | Dimattio et al. | ............ | 211/59.2 |

* cited by examiner

*Primary Examiner*—José V Chen
*Assistant Examiner*—Matthew W Ing
(74) *Attorney, Agent, or Firm*—Stroock & Stroock & Lavan LLP

(57) ABSTRACT

Embodiments of a rack assembly for housing cages comprise at least one shelf, the shelf having a shelf section comprising a runner capable of being positioned in a least a first position and a second position. The shelf section is constructed and arranged to accommodate two cages having a first and second widths when the runner is positioned in the first position. The shelf section is constructed and arranged to accommodate a single cage having a third width when the runner is in a second position, the first and second widths being less than the third width.

41 Claims, 15 Drawing Sheets

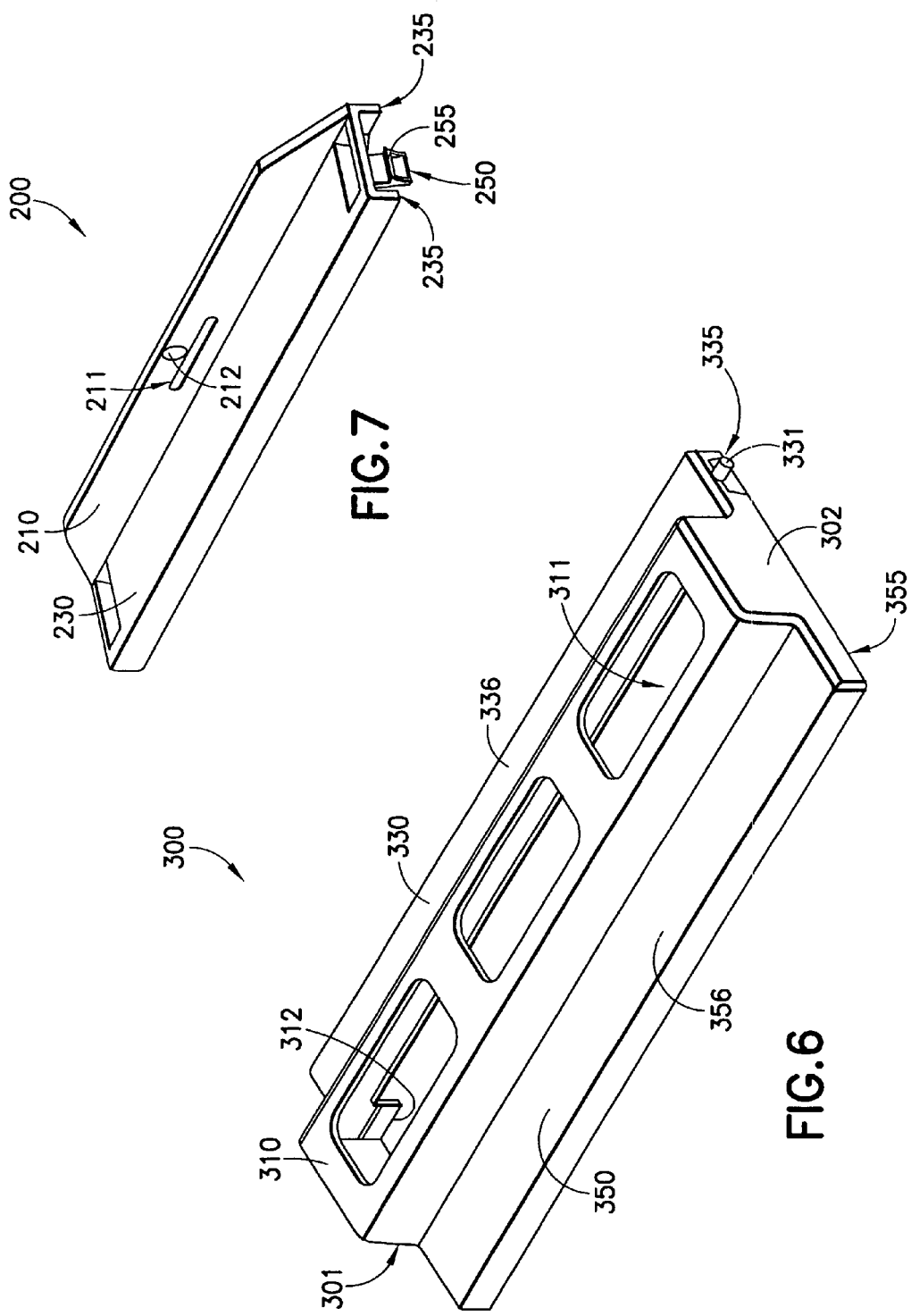

RACK SYSTEM FOR HOUSING ANIMALS IN CAGES HAVING DIFFERENT WIDTHS

CROSS-REFERENCE TO RELATED APPLICATIONS

This application claims the benefit of U.S. Provisional Application Ser. No. 60/619,249, filed on Oct. 15, 2004, entitled "RACK SYSTEM FOR HOUSING ANIMALS IN CAGES HAVING DIFFERENT WIDTHS", which is hereby incorporated in its entirety by reference.

BACKGROUND OF THE INVENTION

1. Field of the Invention

The invention relates generally to a rack systems for housing animals.

2. Description of Related Art

It is well known in the art to house laboratory animals, such as mice and rats, in cages. It is also well known in the art to house the cages on racks. These cages are typically suspended from the shelf above the cage via a rim or flange that extends outward from the top of the cage. The cages can be designed such that they are placed without a cage top into the rack, and ambient air is permitted to enter into the cage. Other cages can be ventilated, and, when placed in a rack, environmentally controlled (e.g., air-flow and air exchange rate) by a fan or air supply system of the rack.

One such ventilated cage and rack system is disclosed in U.S. Pat. No. 6,158,387, assigned to Lab Products, Inc., in which a rack includes an air exhaust plenum and a canopy. The canopy is capable of supporting a cage within the rack above the canopy, and also positioning another cage below the canopy so as to permit air to be drawn into the air exhaust plenum from the interior of the second cage through the top of the second cage and to also permit ambient air to be drawn across the top of the second cage into the air exhaust plenum. Cages for such systems may be referred to as cage level barrier cages because they provide for a barrier between the interior and exterior of the cage such that contaminants from the interior of the cage do not readily leave the cage, and likewise, contaminants from the exterior of the cage do not readily enter the interior of the cage.

Other, non-ventilated racks are designed such that a cage hangs from or is otherwise positioned below a perforated shelf, so that air may pass through the shelf perforations and into a cage. In some instances, a filter which is placed on the perforated shelf, such that air is filtered as it passes through the perforations in the shelf and into a cage.

Such ventilated cage and rack systems were satisfactory. However, due to the manner in which the cage is positioned within the rack, only a single width of cage may be accommodated by the rack. Thus, certain racks were designed to house relatively wide cages, while other racks were designed to house relatively narrow width cages.

In some situations, however, personnel may benefit from the use of cages having different widths. This situation may arise when a study is performed using animals of different species or sizes. A larger animal, or different species of animal, may require a larger cage size than another. Additionally, for the purposes of a study, it may be desirable to house a larger number of animals in one cage than in another, consequently requiring different size cages. Furthermore, in some circumstances, a single cage size may be used, with a larger than needed cage being used for containing animals. This strategy, however, typically leads to a waste of valuable space. Additionally, two different racks may be used, each rack accommodating a different size cage, but again, this strategy also tends to lead to the wasting of valuable space. As such, a need exists for an improved ventilated cage and rack system.

Furthermore, it is undesirable to use an existing single cage size rack to house double racks. For example, one known method of retaining cages in a rack is the use of suspending brackets in each section in which the flanges on the top of cages can be inserted and retained in place. A typical double cage cannot be inserted in the place of two single cages because of the brackets in between the two sections. A modified double cage must be produced, which can cause further disadvantages. For example, the modified double cage can have a cut out where the brackets in between the sections can pass through. However, because most cages are made of plastic, cutting out a portion of the cage can weaken the cage. The cage can break, or bend in at the cut out because of the weight of the cage and its contents, ultimately leading to the cage falling off the rack.

Furthermore, the weight of the double cage would be resting on two brackets typically intended for single cages. Therefore, the extra weight may cause the brackets or the thin shelf above, from which the brackets extend, to bow. Because the double cage would be hanging on the brackets, the bow in the brackets or shelf may also result in the cage falling off the rack.

Accordingly, there is a need for a cage rack system that can overcome the deficiencies of known cage and rack systems.

SUMMARY OF THE INVENTION

Embodiments of the present invention satisfy these and other needs. Generally, embodiments of the invention are directed to a rack system wherein the rack has shelves that can facilitate placement of, for example, one wide cage, or two narrow cages on each section of a shelf, preferably while still maintaining proper air flow into and out of the cages. By employing the invention, lab personnel may combine both wide and narrow cages within the same rack, thus saving time and space by not having to rely on two separate racks if the use of different sized cages is desired.

An embodiment of the invention may comprise a rack assembly for housing cages comprise at least one shelf, the shelf having one or more shelf sections, each shelf section comprising a runner capable of being positioned in a least a first position and a second position. According to an embodiment of the invention, the shelf section is constructed and arranged to accommodate either two cages having a first width when the runner is positioned in the first position, or a single cage having a second width when the runner is in a second position, the first width being less than the second width.

An embodiment of the invention may comprise a rack system having a rack including at least one shelf having a plurality of runners disposed on the shelf, the runners being adapted to position a cage assembly on the shelf in between the runners. Preferably, a gap exists between the top of the cage resting on the runners and the bottom of a cage on the shelf above, so as to permit air to flow in and out of the cage through the top of the cage. The cages suitable for placement within a rack in accordance with the invention may be single size cages having a first width and double size cages having a second width, the second width being greater than the first width.

The present invention accordingly comprises the features of construction, combination of elements, arrangement of parts, which will be exemplified in the disclosure herein, and the scope of the present invention will be indicated in the claims.

BRIEF DESCRIPTION OF THE DRAWINGS

In the drawing figures, which are merely illustrative, and wherein like reference characters denote similar elements throughout the several views:

FIG. 6 is a rear perspective view of a runner of a rack system constructed in accordance with the present invention;

FIG. 7 is a perspective view of a runner of a rack system constructed in accordance with the present invention;

FIG. 17 is a perspective view of a section of a shelf of FIG. 2 with a runner being moved into the up position;

FIG. 18 is a perspective view of a section of a shelf of a rack system constructed in accordance with the present invention;

FIG. 19 is a reverse perspective view of a section of a shelf of a rack system constructed in accordance with the present invention;

DETAILED DESCRIPTION OF EXEMPLARY EMBODIMENTS

Embodiments of the invention are directed to a rack system wherein the rack has shelves having sections that can facilitate placement of one relatively wide cage, or a plurality of, preferably two, relatively narrow cages, on each section of a shelf. Preferably, the rack system allows for a beneficial air flow into and out of the cages.

Figure 15:
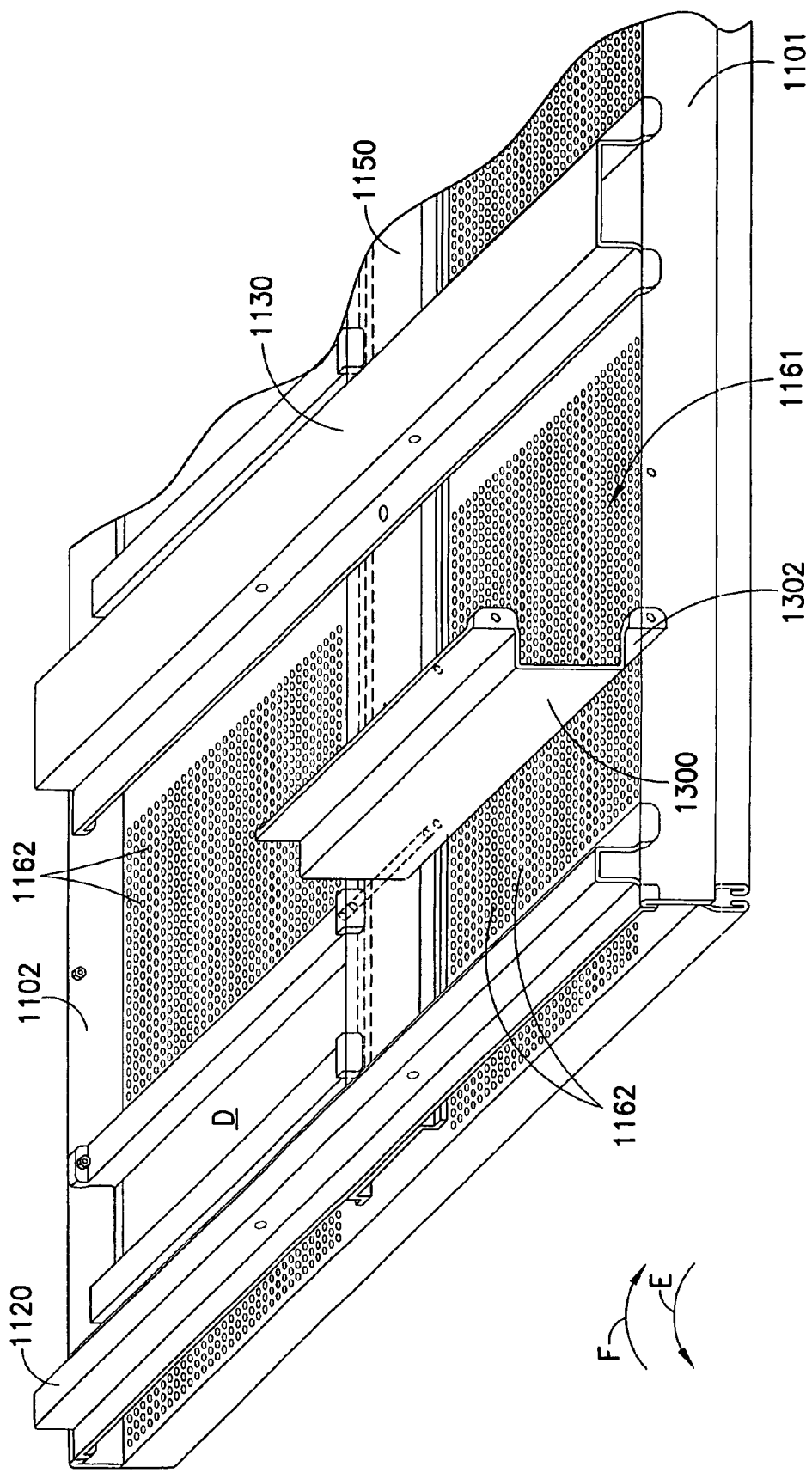
FIG. 15 is a front perspective view of a section of a shelf of a rack system constructed in accordance with the present invention.

Reference is first made to FIGS. 1-4, wherein a rack system, generally indicated at 10, constructed in accordance with the invention is shown. Rack system 10 preferably includes an open rack having corner beams 12, a top 116, a bottom 17, and shelf assemblies 100. Shelf assemblies 100 preferably comprise a front panel 110, a rear panel 120, fixed runners 200, pivoting runners 300, support runners 150a,b, and shelf base 160. One known benefit of rack system 10 constructed in accordance with the invention is the fact that rack system 10 can house cages of varying sizes, namely single size cage 1 and double size cage 2 as shown in FIG. 15.

Figure 5:
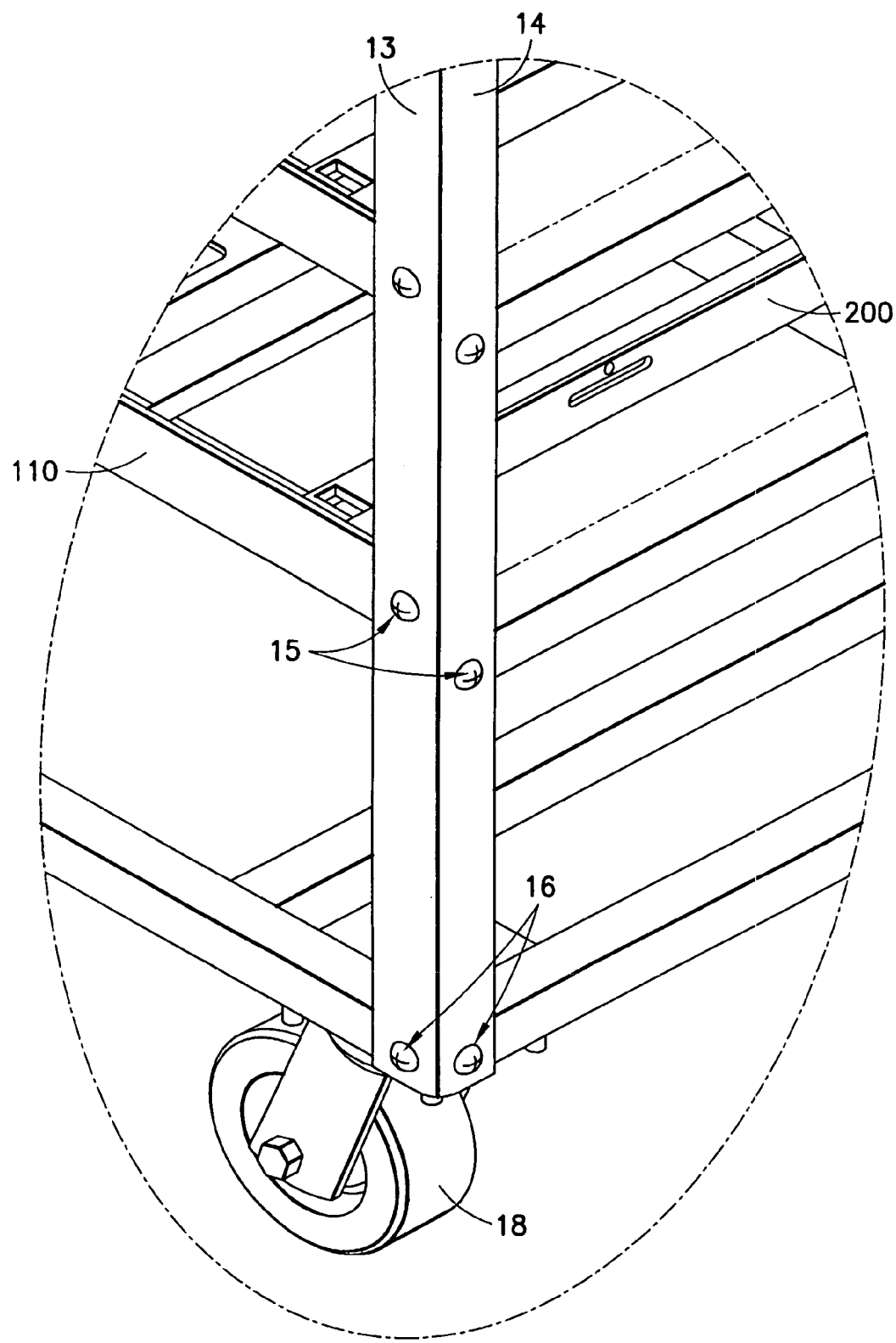
FIG. 5 is a magnified view of a selected portion of the rack system of FIG. 1.

Shelf assemblies 100 are preferably connected to corner beams 12. Corner beams 12 preferably comprise two vertical panels 13, 14, wherein vertical panel 13 faces the front or rear and vertical panel 14 faces the side. More preferably, front panel 110 and rear panel 120 engage vertical panel 13 and shelf base 160 engages vertical panel 14 via bolts 15 as illustrated in FIG. 5. Bottom 17 is also preferably connected to corner beams 12 at both vertical panels 13,14 via bolts 16, and comprises wheels 18 to provide portability.

According one embodiment of the invention, corner beams 12 can accommodate a variable number of shelf assemblies 100, according to the end user's needs. For example, shelf assemblies 100 and corner beams 12 can be provided to the end user to assemble, whereupon the end user may attach a desired number of shelf assemblies 100 at the desired spacing, depending on the height of the cages being placed within rack system 10. For example, the same rack system can be arranged to comprise six shelves to house rat cages or eight shelves to house mice cages. Alternatively, a predetermined number of shelf assemblies 100 can be attached to corner beams 12 prior to being provided to the end user.

Whereas shelf assembly 100 and its components will be described herein with reference to the front portion of shelf assembly 100, between front panel 110 and support runner 150a, it is to be understood that the same description applies to the rear portion of shelf assembly 100, between rear panel 120 and support runner 150b, with the exception that the rear portion is a mirror image of the front portion. Accordingly, the rear portion will not be described independently.

Figure 1:
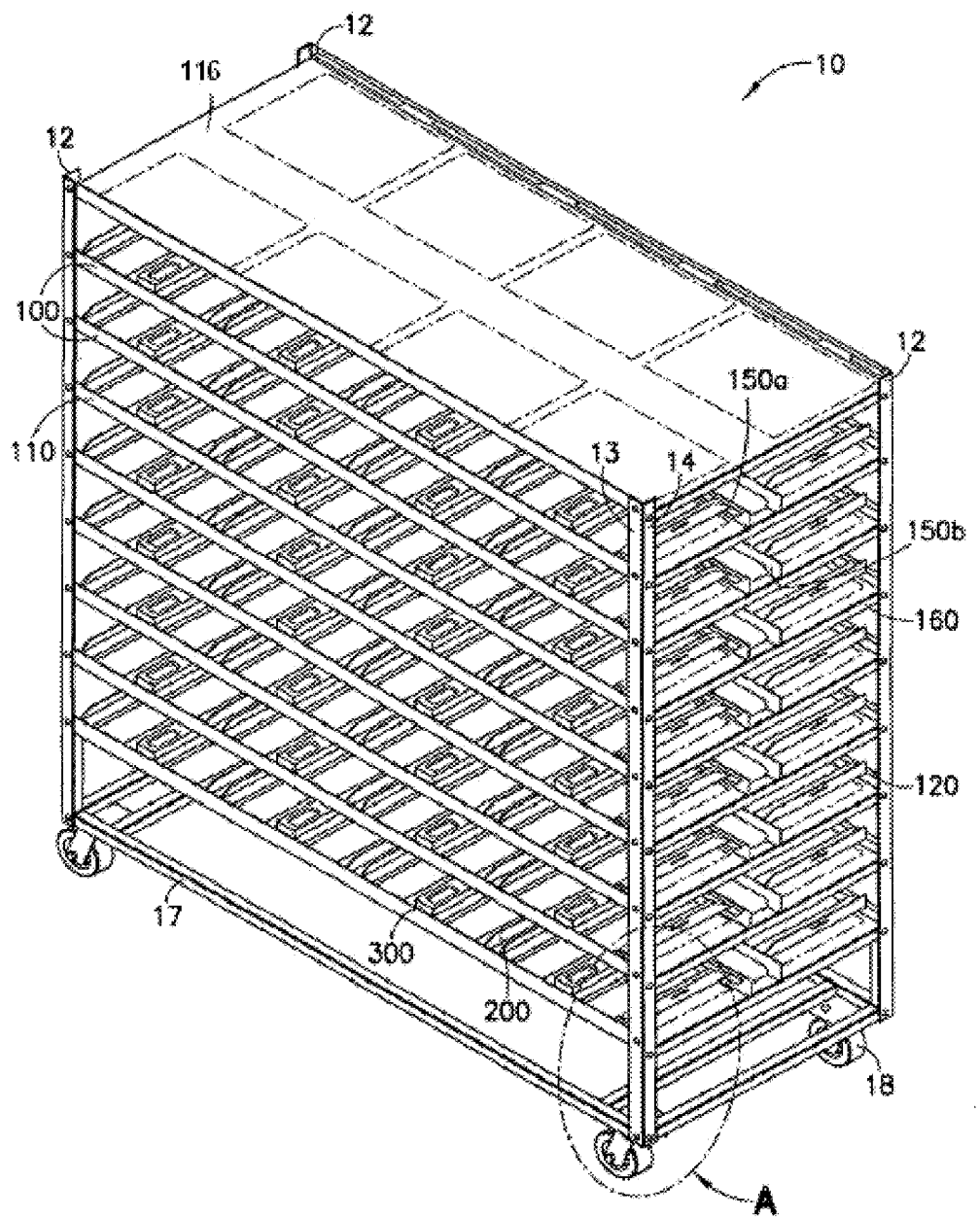
FIG. 1 is a perspective view of a rack system constructed in accordance with the present invention.
Figure 2:
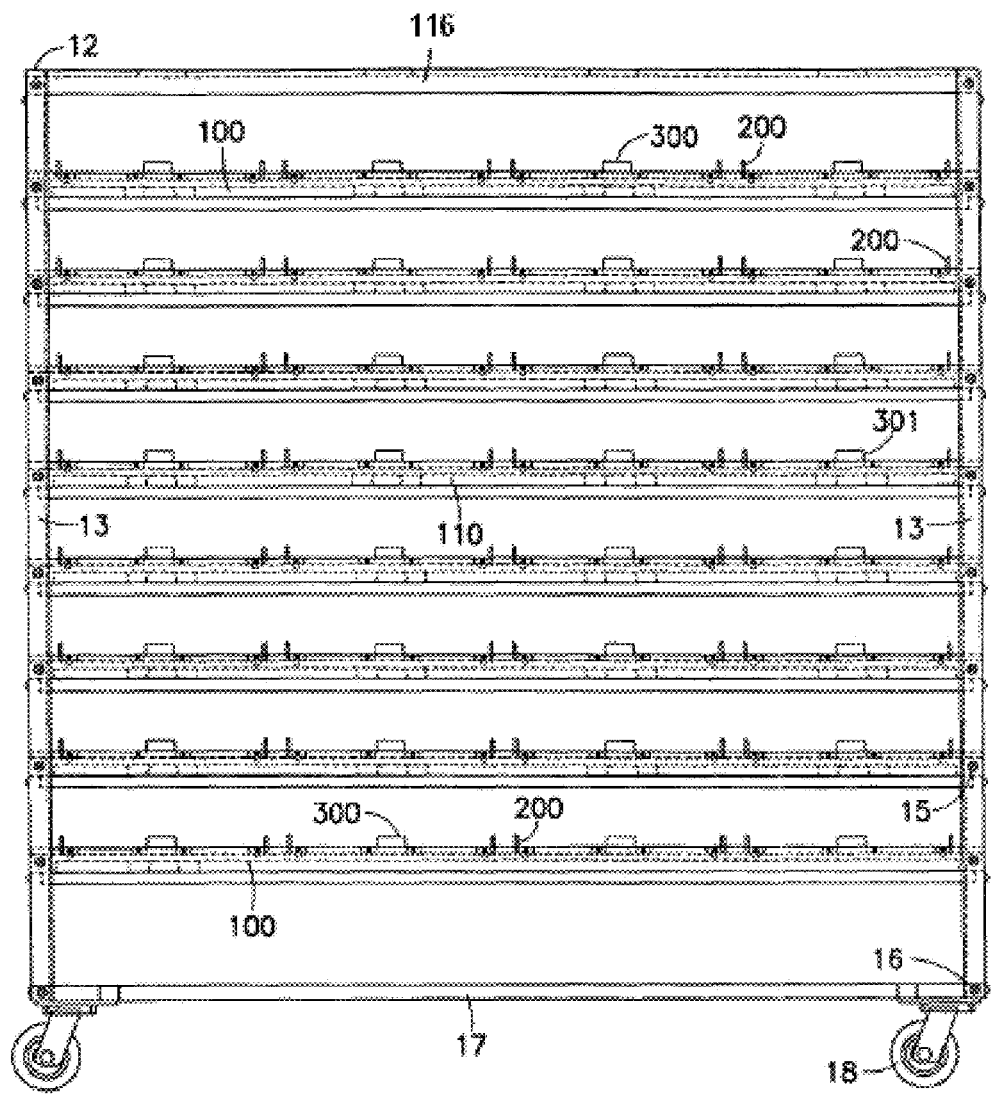
FIG. 2 is a front view of the rack system of FIG. 1.
Figure 3:
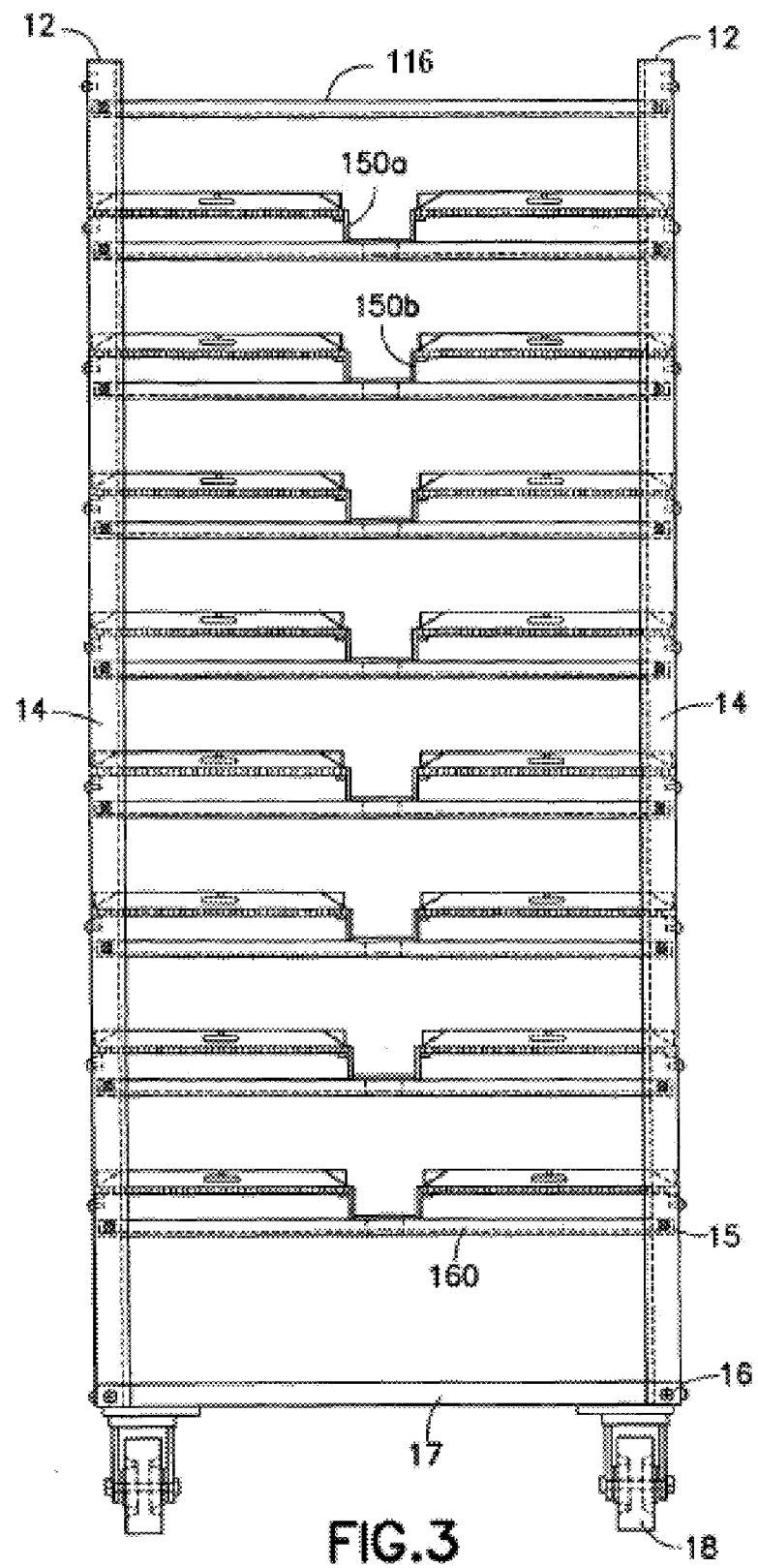
FIG. 3 is a side view of the rack system of FIG. 1.
Figure 4:
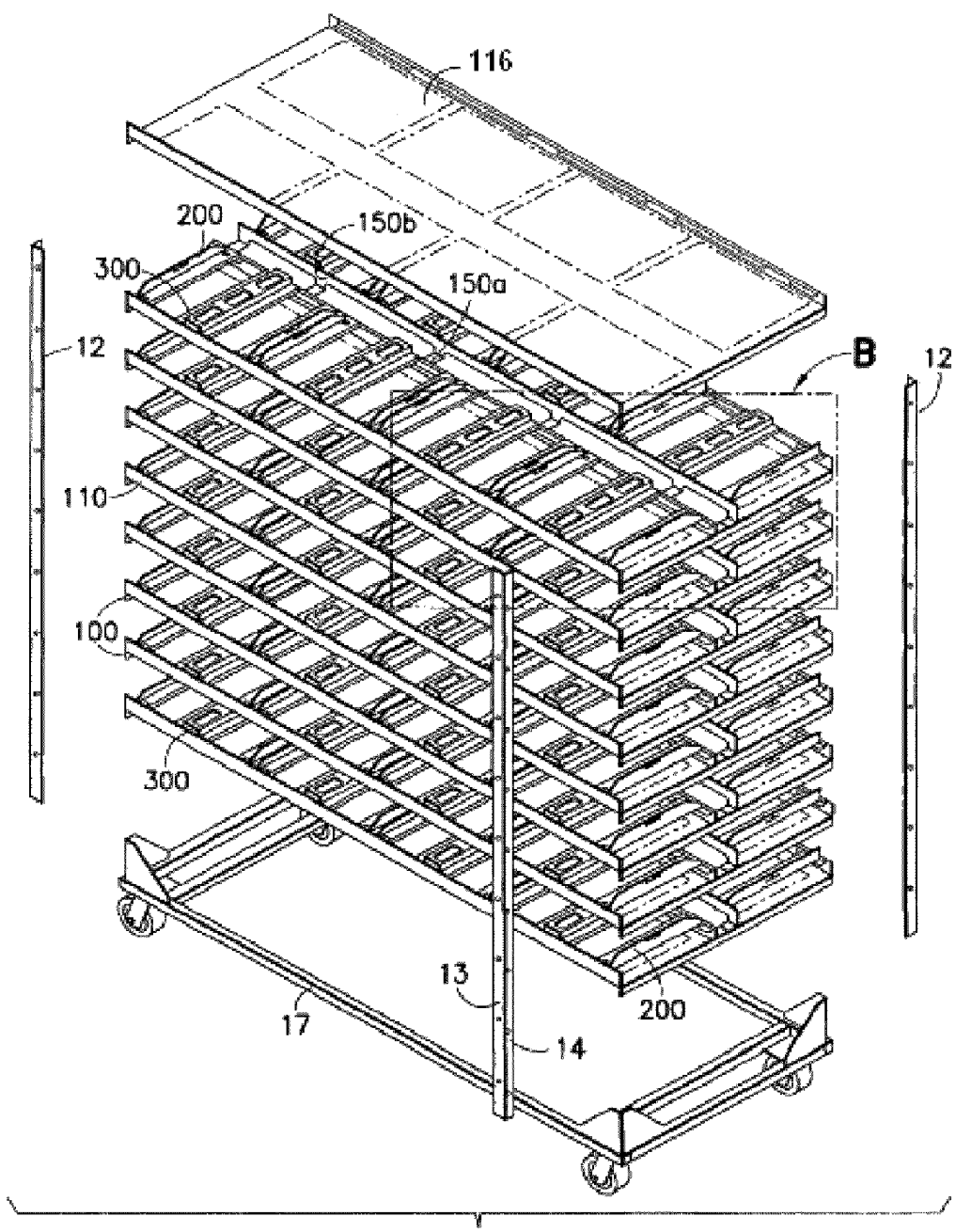
FIG. 4 is an exploded perspective view of the rack system of FIG. 1.
Figure 9:
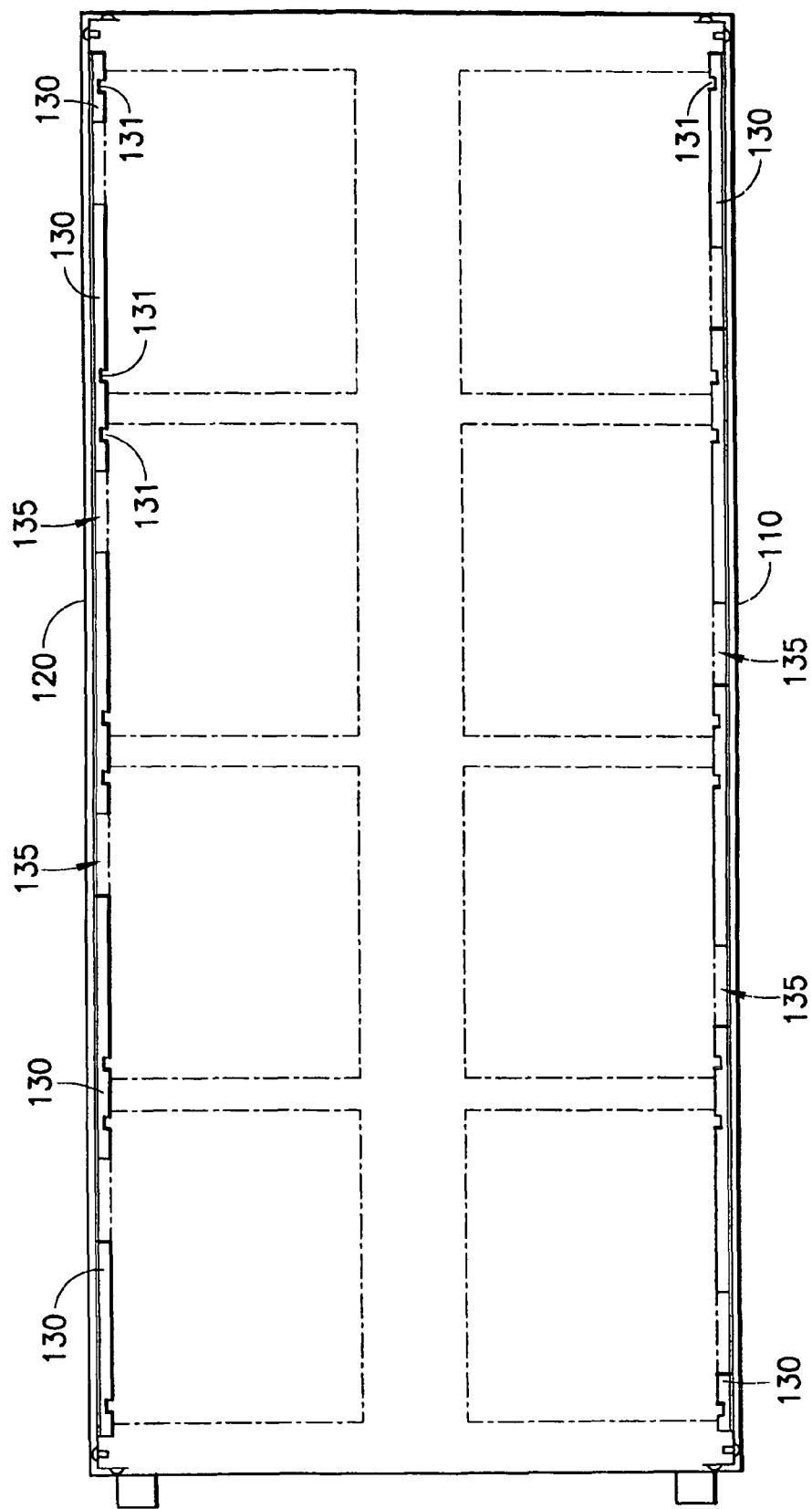
FIG. 9 is a top view of the rack system of FIG. 1.

As shown in FIGS. 1, 4 and 9, top 116 is preferably substantially similar to a shelf assembly 100 without runners 200, 300, 150a,b. Accordingly, reference will be made to FIG. 9 in describing front and rear panels 110, 120 and shelf base 160 of shelf assembly 100.

Referring to FIG. 9, front and rear panels 110, 120 of shelf assembly 100 preferably comprise a plurality of support flanges 130 projecting sufficiently inward to support fixed runners 200 and pivoting runner 300 thereon. Similarly, referring to FIG. 8, support runner 150a preferably comprises a plurality of support flanges 151 projecting toward front panel 110 sufficiently inward to support fixed runners 200 and pivoting runner 300 thereon. Furthermore, in accordance with the embodiment shown in FIGS. 8-9, support flanges 130, 151 comprise notches 132, 152 for receiving corresponding latches 150 of fixed runners 200.

Figure 8:
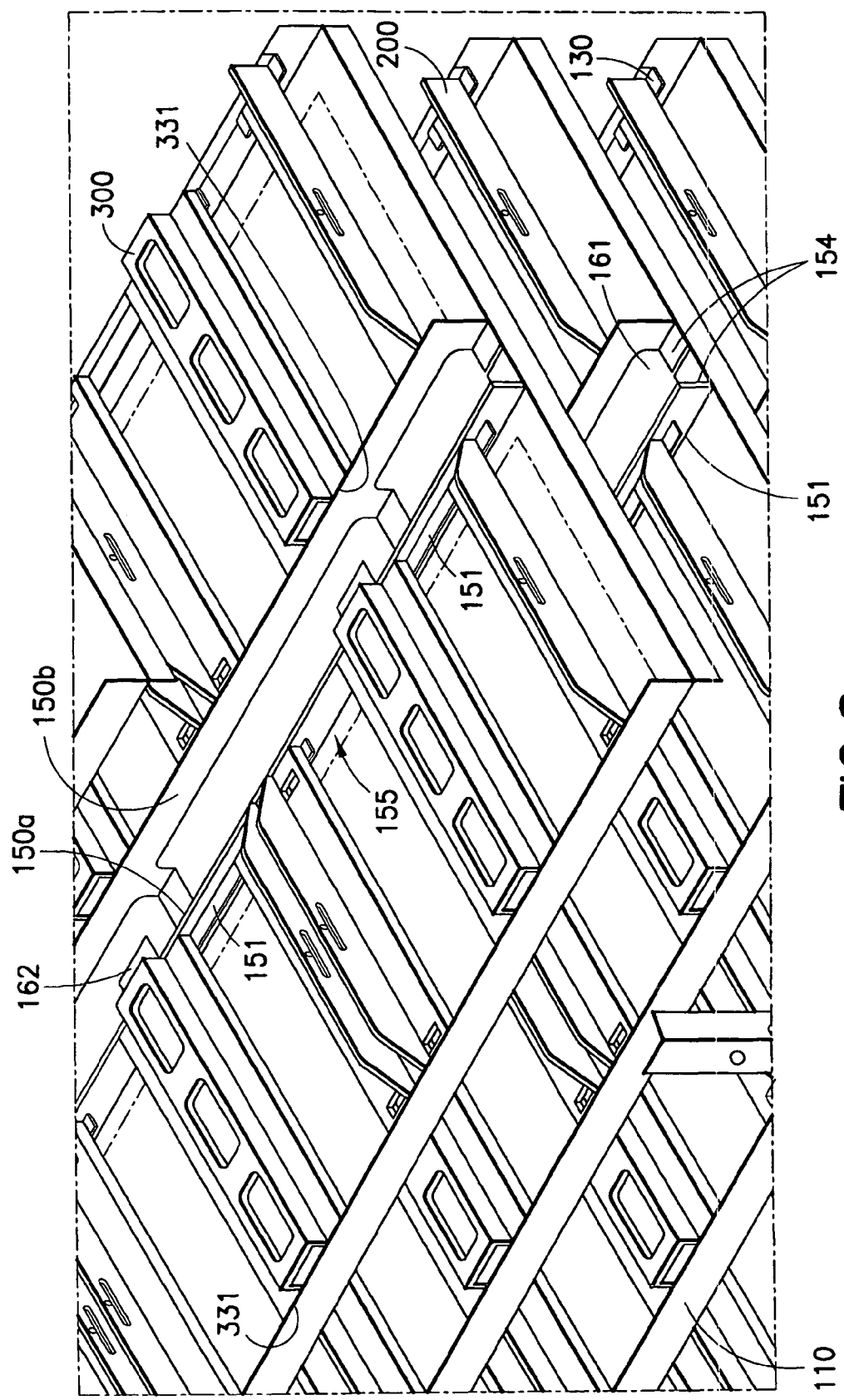
FIG. 8 is a magnified view of a selected portion of the rack system of FIG. 4.

In accordance with the embodiment shown in FIG. 8, support runner 150a preferably comprises a projection 153 extending upward from a base flange 154 and past support flanges 151. More preferably, as illustrated in FIG. 8, base flange 154 and support flanges 151 are located on the opposite sides of projection 153. Base flange 154 preferably contacts shelf base 160 and can be attached to shelf base 160 utilizing weld 161. More preferably, each shelf assembly 100 will comprise a plurality of welds 161 to secure support runners 150a,b to shelf base 160. In accordance with a preferred embodiment of the invention, welds 161 comprise supports 162 which preferably further help secure support runners 150a,b to shelf base 160.

An embodiment of a pivoting runner 300 is shown in FIG. 6. As illustrated, pivoting runner 300 comprises a pivot flange 330 and stopper flange 350. Pivoting runner 300 can also comprise a projection 310 extending upward from pivot flange 330 and stopper flange 350 when pivoting runner 300 is in the upward position. Likewise, projection 310 extends downward from pivot flange 330 and stopper flange 350 when pivoting runner 300 is in the downward position. As illustrated in FIG. 6, projection 310 can comprise apertures 311.

A preferred embodiment of pivoting runner 300 comprises a pivot rod 331 at both ends, which extend out from a front surface 301 and a rear surface 302. Pivot rod 331 at front surface 301 is preferable constructed and arranged to be inserted into a corresponding aperture in front panel 110 or rear panel 120. Similarly, pivot rod 331 at rear surface 302 is preferably constructed and arranged to be inserted into a corresponding aperture in support runner 150*a*.

A preferred embodiment of a fixed runner 200 is illustrated in FIG. 7. As shown, fixed runner 200 comprises a projection 210 having a slot 211 and an aperture 212, both located approximately midway along the length of projection 210. Aperture 212 is preferably constructed and arranged to receive a button or the like suitable for applying a slight pressure on the bottom side of a cage when a cage is placed on fixed runner 200. This slight pressure can help stabilize the cage in place and prevent accidental movement of the cage, for example, while the rack is being transported, from excessive movement of the animal housed in the cage, etc. Slot 211 preferably provides flexibility of projection 210. For example, if a cage is pressed up against the button in aperture 212, slot 211 can permit projection 210 to flex slightly outward, which can help prevent projection 210 from being permanently deformed from the pressure.

The embodiment of the fixed runner shown in FIG. 7 further comprises a fixed flange 230 for supporting a portion of a cage thereon. Fixed flange 230 can comprise a latch 250 on either end, extending downward toward shelf base 160. Preferably, fixed runner 300 is fastened to support flange 130 of front panel 110 and support flange 151 of support runner 150*a* utilizing latches 250. In accordance with the embodiment shown in FIG. 7, latch 250 comprises a latch stopper 255 and a tab 256. Preferably, fixed runner 300 is positioned so as to align latches 250 with corresponding notches 132, 152 of support flanges 130, 151 and is pressed toward shelf base 160. Preferably, latches 250 will be slightly displaced away from support flanges 130, 151, thereby permitting tabs 256 and latch stoppers 255 to slide through notches 132, 152. For each latch 250, once tab 256 and latch stopper 255 slides through notch 132, 152, latch 250 can revert back to its original position and therefore exert a relatively small pressure toward support flange 130, 151. Most preferably, latch stopper 255 contacts the bottom surface of support flange 130, 151 and a fixed base 235 of fixed flange 230 contacts the top surface of support flange 130, 151, thereby substantially preventing the vertical movement of fixed runner 200 with respect to support flange 130, 151. Additionally, the widths of latch 250 and notch 132, 152 can be sufficiently similar so as to substantially prevent lateral movement of fixed runner 200 once it is in place.

When pivoting runner 300 is in the upward position, as shown in FIGS. 1, 4 and 8, pivot base 335 and stopper base 355 can rest on support flanges 130, 151. In accordance with a preferred embodiment of pivoting runner 300, projection 310 comprises a plurality of projection bases 312. Most preferably, projection 310 comprises four projection bases 312 which also contact support flanges 130, 151 and provide additional stability and support. Accordingly, when pivoting runner 300 is in the upward position, single cage 1 can be retained between fixed runner 200 and pivoting runner 300. More specifically, singe cage 1 can rest on fixed flange 230 and either pivot flange 330 or stopper flange 250, according to the position and arrangement of each. For example, referring to FIG. 2, a section of shelf assembly 100 can be bordered by two fixed runners 200 having fixed flanges 230 projecting toward each other. Preferably, the section also includes a pivoting runner 300 in between the two fixed runners 200, thus permitting two single cages 1 to be positioned in the section, one on either side of pivoting runner 300, when in the upward position. Alternatively, the section can include more than one pivoting runner 300 in between two fixed runners 200 as a matter specific to design choice, without deviating from the scope of the invention.

When pivoting runner 300 is in the downward position, more specifically, rotated about pivot 331 approximately 180 degrees from the upward position, pivoting runner 300 is supported on support flanges 130, 151 by pivot surface 336 and stopper surface 356 which contact support flanges 130, 151 and are prevented from further movement. When being moved from the upward position to the downward position, the front end of projection 310 passes through a gap 135 in support flange 130, shown in FIG. 9, until pivoting surface 336 and stopper surface 356 contact support flanges 130, 151. Likewise, the rear end of projection 310 passes through a gap 155 in support flange 151, as shown in FIG. 8, until pivoting runner 300 cannot be rotated any further. Hence projection 310 extends below support flanges 130, 151. Pivot base 335 and stopper base 355, which are now facing up, preferably do not extend past the top surface of fixed flange 230, hence providing a surface level with fixed flange 230. Accordingly, a double cage 2, wider than single cage 1, can be positioned thereon, being support by fixed flanges 230 on either end of double cage 2. Most preferably, pivoting runner 300 also provides additional support for double cage 2 in between fixed runners 200.

In accordance with a preferred embodiment of the invention, fixed runner 200 and pivoting runner 300 comprise plastic and are manufactured utilizing injection molding. Plastic permits slight deformation of fixed runners 200 and pivoting runner 300 without causing permanent damage, and is thus preferred. This can also reduce the cost of manufacturing rack assembly 10.

Figure 10:
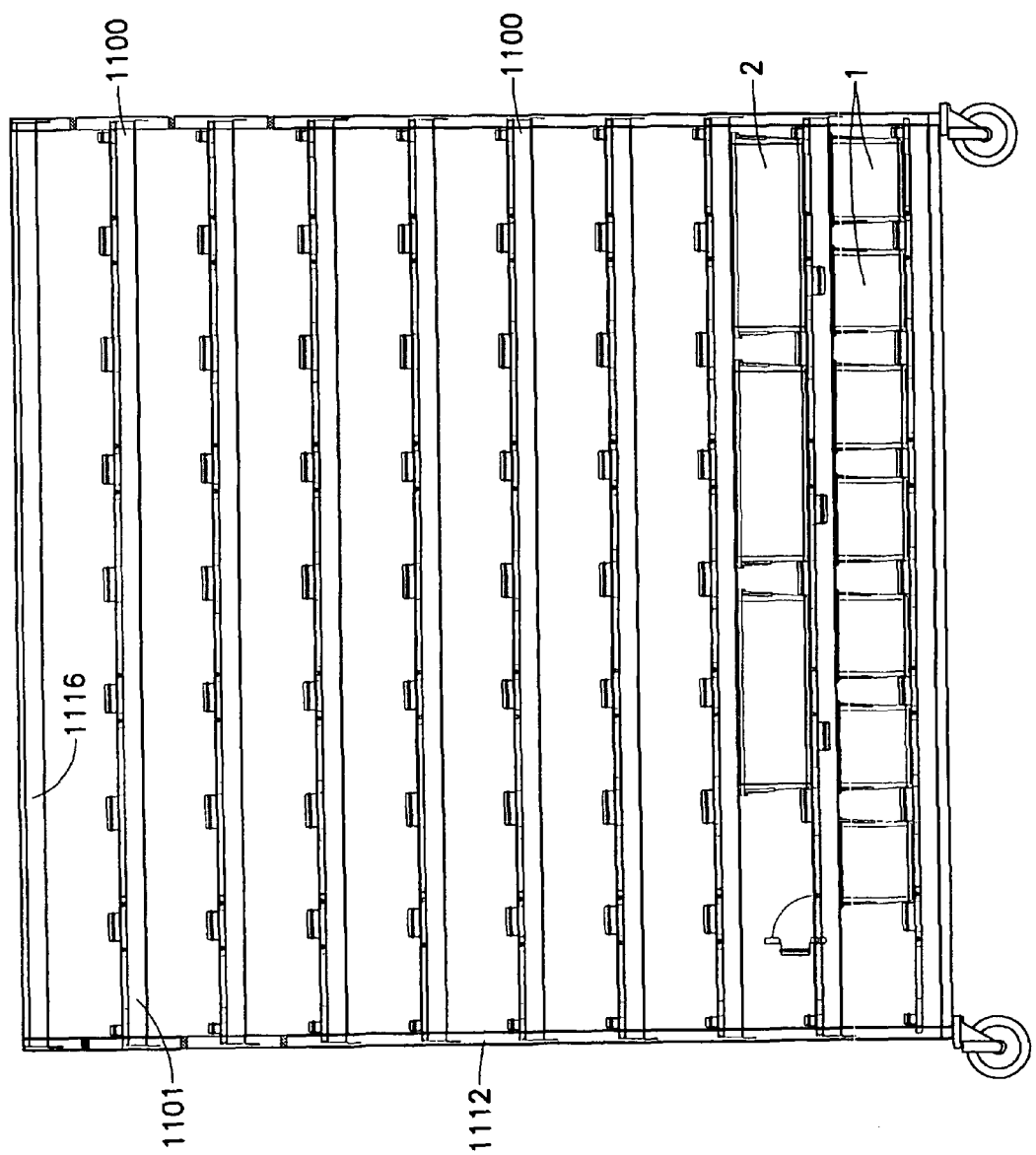
FIG. 10 is a front view of a rack system constructed in accordance with the present invention.
Figure 11:
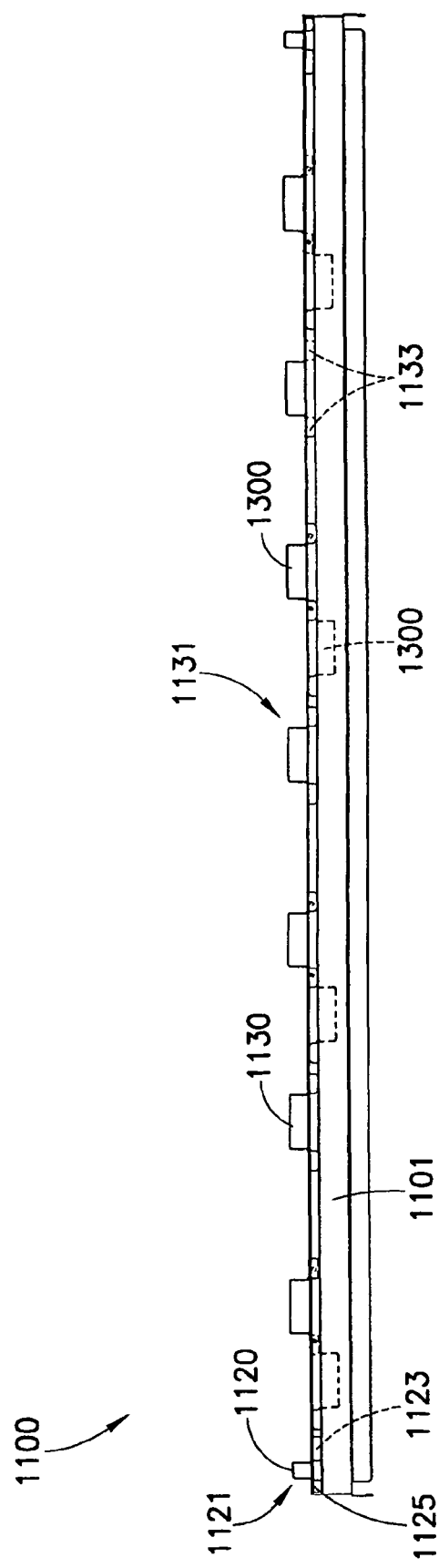
FIG. 11 is front view of a shelf of a rack system constructed in accordance with the present invention.
Figure 12:
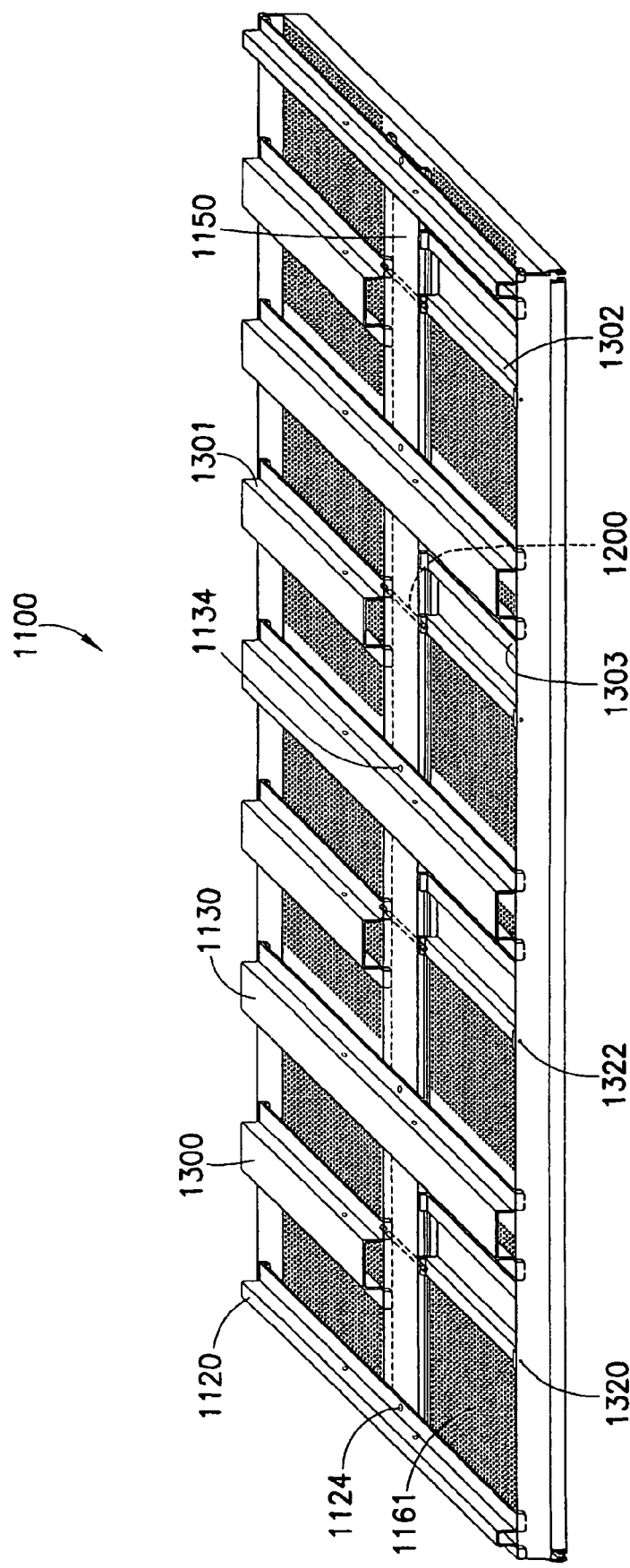
FIG. 12 is a reverse perspective view of the shelf of FIG. 10.
Figure 13:
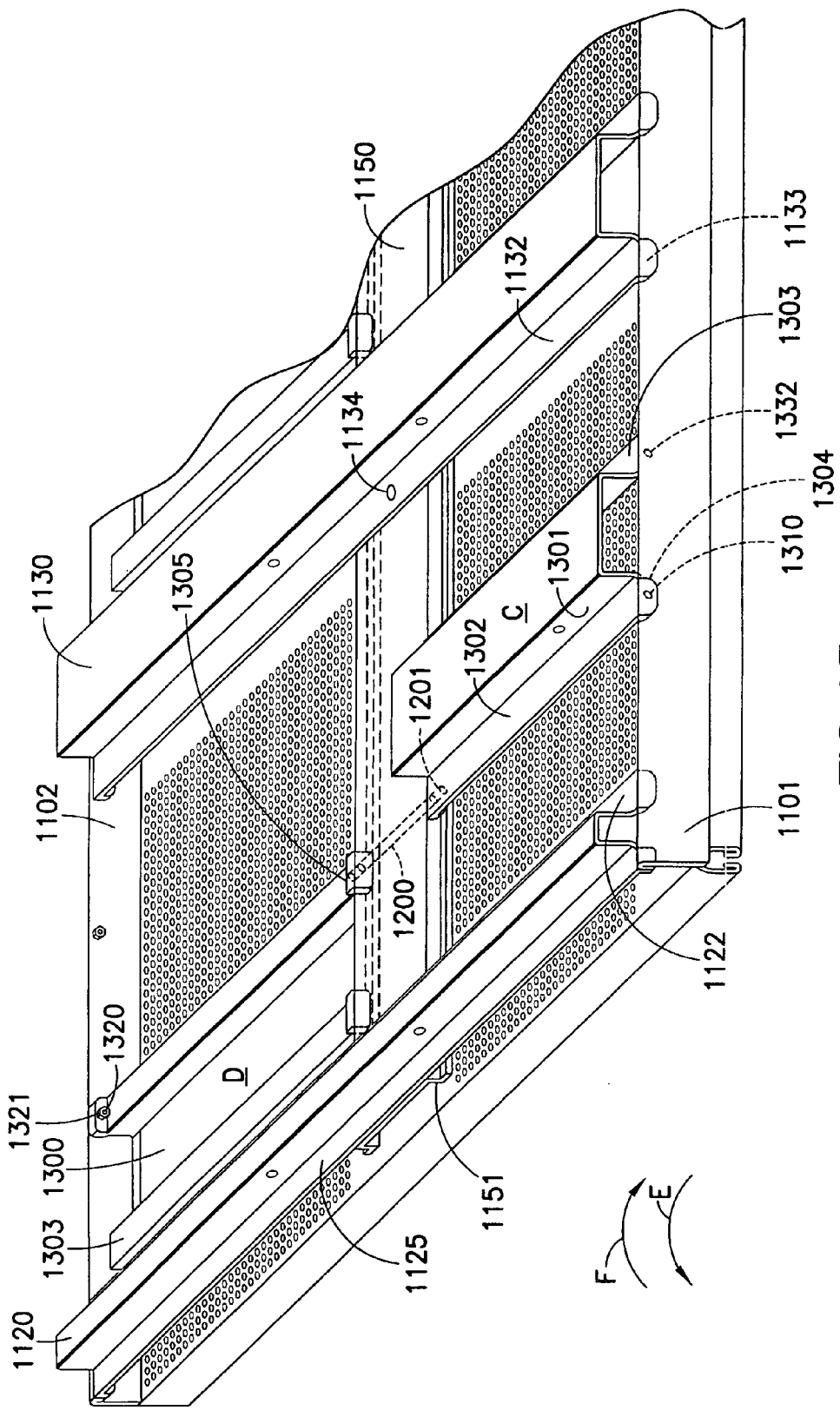
FIG. 13 is a perspective partial view of a section of the shelf of FIG. 10.
Figure 16:
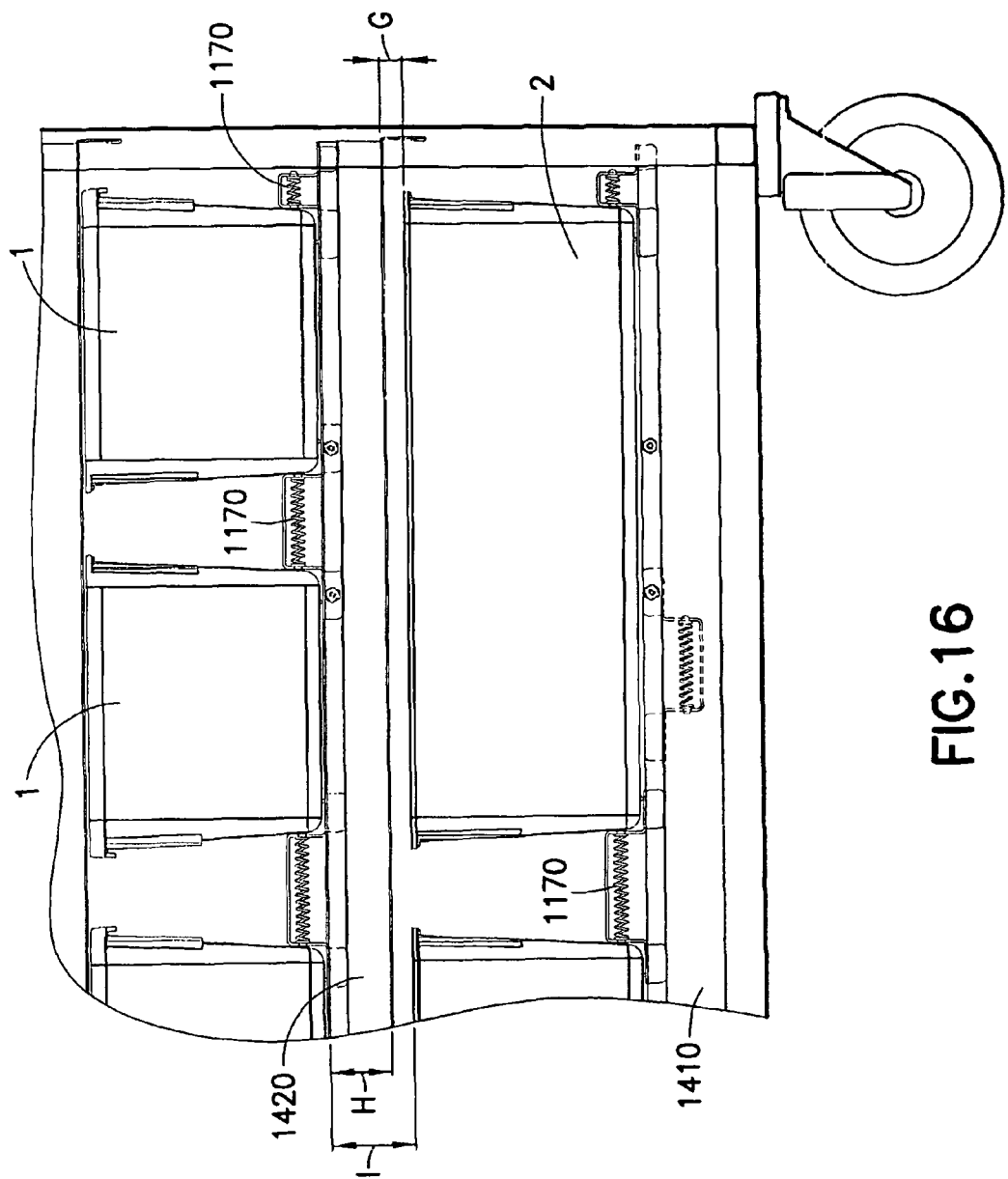
FIG. 16 is a front partial view of two shelves of FIG. 9.

Reference is made to FIGS. 10-16, which show another embodiment of a rack system in accordance with the invention, preferably manufactured utilizing a strong, durable material, more preferably steel. Referring to FIGS. 10 and 16, end runners 1120 can be connected to corner beams 1112 and/or front panel 1101 and rear panel 1102. Preferably, end runners 1120 are fixed to front panel 1101 and rear panel 1102, as illustrated in FIGS. 12-13. End runners 1120 preferably comprise a projected portion 1121, an inner flange 1122, an outer flange 1125 and a plurality of flaps 1123. In a preferred embodiment of the invention, flaps 1123 are welded to front panel 1101 and rear panel 1102. Inner flange 1122 preferably comprises an aperture 1124 through which a screw or similar device can be inserted in order to connect end runner 1120 to support runner 1150.

More preferably, front panel 1101 and rear panel 1102 are connected to a shelf base 1160 which are preferably connected to corner beams 1112. Likewise, a rack in accordance with an embodiment of the invention as shown in FIG. 10 can comprise a top 1116, preferably resembling the shelf base 1160, which can be preferably connected to corner beams 1112.

Section runners 1130 can be connected, preferably fixed, most preferably welded, to front panel 1101 and rear panel 1102 via flaps 1133. Section runners 1130 also preferably comprise projected portion 1131 and flanges 1132. In a preferred embodiment of the invention, flanges 1132 of section runner 1130 include one or more apertures 1134. A screw or similar device can be inserted into apertures 1134 in order to connect section runner 1130 to support runner 1150, preferably substantially near the midpoint of the length of section runner 1130. Support runner 1150 can be connected to every section runner 1130, alternating section runners 1130, or just one section runner 1130 as shown in FIG. 12, as a matter specific to design choice.

Support runner 1150 can comprise projected portion 1151 which preferably include apertures which can align with apertures 1124 and 1134 of end runners and one or more section runners, respectively. In a preferred embodiment, a screw is inserted through aperture 1124, 1134, then through the aperture of support runner 1150, such that a portion of the screw extends past the underside of support runner 1150. Preferably, a nut or similar retaining device is utilized to secure the screw in place and to maintain support runner 1150 connected to end runner 1120 or section runner 1130. Support runner 1150 can also comprise flanges 1152 and rod apertures 1155 through which rod 1200 can be inserted.

In accordance with a preferred embodiment of the invention, rod 1200 is generally long and narrow, having a round cross-section. Whereas other shapes are acceptable without deviating from the scope of the invention, a round cross-section is most preferred in order to facilitate the rotation of a rear pivoting flap 1305 of pivoting runner 1300 about rod 1200. Rod 1200 can be inserted via rod aperture 1155 through projected portion 1151 of support runner 1150. Rod 1200 can be further inserted until one end exits projected portion 1151 of support runner 1150 through rod aperture 1155 on the opposite side of projected portion 1151 of support runner 1150. Preferably, protrusion 1201, a relatively small portion of rod 1200, extends beyond rod aperture 1155 on both sides of projected portion 1151. Pivoting runner 1300 preferably engages rod 1200 at protrusion 1201 and pivots about rod 1200.

Figure 14:
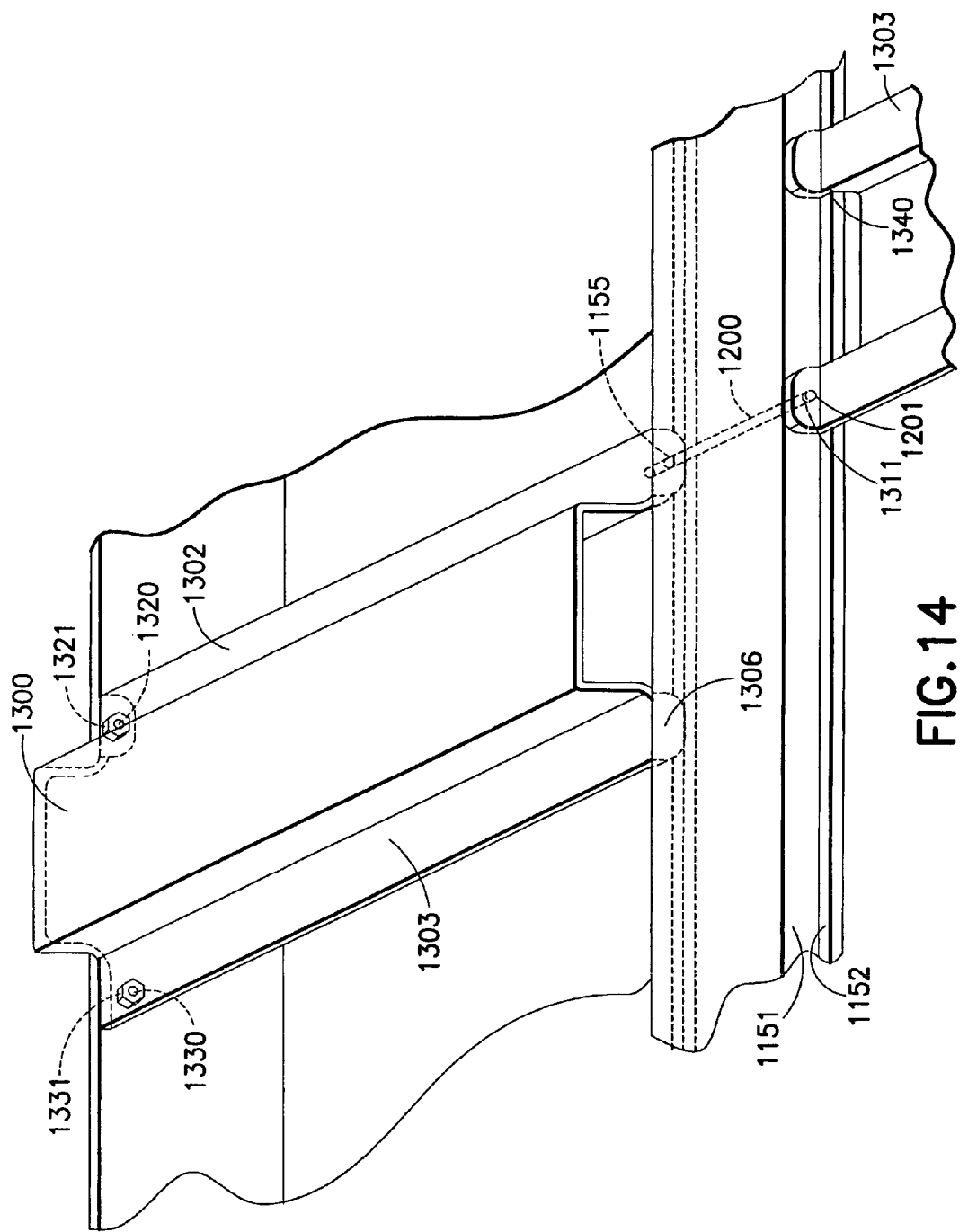
FIG. 14 is a reverse perspective view of a section of a shelf of a rack system constructed in accordance with the present invention.

Referring to FIGS. 11-12, a preferred embodiment shelf assembly 1100 includes four sections, each section defined by end runner 1120 and section runner 1130 or two adjacent section runners 1130. Reference is now made to FIGS. 13-14, which depict a section of shelf assembly 1100, more specifically, the section farthest to the left, defined by end runner 1120 and section runner 1130. As seen in FIGS. 13-14, pivoting runner 1300 preferably comprises a projected portion 1301, a pivot flange 1302 and a stopper flange 1303. Pivot flange 1302 preferably includes a front pivoting flap 1304 having a front pivoting aperture 1310 and a rear pivoting flap 1305 having a rear pivoting aperture 1311. Stopper flange 1303 preferably includes a stopper flap 1306. Preferably, rear pivoting aperture 1311 is generally circular in shape and capable of receiving rod 1200. According to a preferred embodiment, protrusion 1201 extends beyond rear pivoting aperture 1311 to help secure pivoting runner 1300 in place as it pivots about rod 1200.

In use, when pivoting runner 1300 is in an upward position C, projected portion 1301 extends above pivot and stopper flanges 1302, 1303, and above front panel 1101 and support runner 1150. Pivoting runner 1300 can also be in a downward position D, wherein projected portion 1301 is below pivot and stopper flanges 1302, 1303, which is either flushed with or below the uppermost surface of front panel 1101 and/or support runner 1150. Most preferably, projected portion 1301 extends downward past flange 1152 of support runner 1150.

According to a preferred embodiment, projected portion 1301 has a length that is shorter than pivot and stopper 1302, 1303. Preferably, the difference in length between projected portion 301 and pivot and stopper flanges 1302, 1303 is substantially similar to the width of flange 1152 of support runner 1150. This can permit projected portion 1301 to extend downward past flange 1152 of support runner 1150 when rear pivoting flap 1305 and stopper flap 1306 are engaged with flange 1152 of support runner 1150.

Front pivoting flap 1304 preferably rotates about a pivot screw 1320 which can be inserted through front panel 1101 via pivot screw aperture 1322. Most preferably, a pivot screw nut 1321 secures pivot screw 1320 in place, to prevent pivot screw 1320 from inadvertently loosening, which can lead to the front portion of pivoting runner 1300 bending as well as pivot screw 1320 falling off shelf assembly 1100, both of which can compromise the stability of cage 1 resting on pivoting runner 1300 to fall off shelf assembly 1100. Alternatively, front pivoting flap 1304 can rotate about an alternate structure, such as a suitable protrusion from the rear surface of front panel 1101.

Front panel 1101 can comprise a stopper screw aperture 1332 to receive stopper screw 1330 and permit stopper screw 1330 to be inserted through stopper screw aperture 1332. Preferably, a portion of stopper screw 1330 protrudes behind front panel 1101, upon which a stopper screw nut 1331 can be coupled.

Pivoting runner 1300 can pivot about pivot screw 1320 and rod 1200, which are aligned, thereby ensuring that pivoting runner 1300 pivots about one axis created by pivot screw 1320 and rod 1200. Pivoting runner 1300 can move in a generally circular direction F to move into upward position C, and in a generally circular direction E to move into downward position D, as shown in FIG. 15.

As shown in FIG. 14, when pivoting runner 1300 is in upward position C, stopper flap 1306 engages flange 1152 of support runner 1150. Whereas stopper flap 1306 is free to move upward, in direction E, away from flange 1152 of support runner 1150, flange 1152 of support runner 1150 prevents stopper flap 1306 from moving any further down. Accordingly, pivoting runner 1300 is prevented from pivoting any further beyond downward position D in direction F.

Whereas stopper flap 1306 engaging flange 1152 of support runner 1150 may suffice in maintaining pivoting runner 1300 in upward position C, additional stopping mechanisms are available. In the most preferred embodiment, shelf assembly 1100 includes two stopping mechanisms for each pivoting runner 1300. For example, as shown in FIG. 14, stopper flange 1303 of pivoting runner 1300 is prevented from moving any further in direction F by stopper screw nut 1331. As shown, a portion of stopper flange 1303 rests on the upper surface of stopper screw nut 1331, and it is prevented from moving any further downward. This additional support for pivoting runner 1300 can provide reinforcement in supporting cage 1 that may rest partially on pivoting runner 1300

FIGS. 11-14 also show pivoting runner in downward position D. As shown, a stopper surface 1340 of stopper flange 1303 engages the top surface of flange 1152 of support runner 1150. Once stopper surface 1340 engages flange 1152 of support runner 1150, stopper flange 1303 is prevented from moving any further beyond flange 1152 of support runner 1150, and therefore, in direction E. Accordingly, pivoting runner 1300 is maintained in downward position D. Although it is not represented, a second stopper mechanism, such as a stopper screw and nut or similar device, may be provided to provide an additional downward position D stopping mechanism as a matter of application specific to design choice.

FIG. 15 shows an embodiment of a shelf assembly with pivoting runner 1300 as it is being moved between upward position C and downward position D.

In a preferred embodiment of the invention, as depicted in FIGS. 10-12, shelf assembly 1100 can further include a shelf base 1160. The most preferred shelf base includes perforated areas 1161 having a plurality of apertures 1162 thereby permitting air transfer between cage 1, 2 and the atmosphere. With reference to FIG. 15, perforated areas 1161 are preferably generally rectangular in shape and coincide with areas defined length-wise by two adjacent section runners 1130 or end runner 1120 and adjacent section runner 1130, and width-wise by front panel 1101 and the front-most surface of support runner 1150, or rear panel 1102 and rear-most surface of support runner 1150.

Apertures 1162 are preferably relatively close together, preferably at a distance in the range of 0.150 in. to 0.350 in., and most preferably of about 0.250 in. between two adjacent apertures 1162. A preferred embodiment of apertures 1162 is generally circular in shape, having a diameter in the range of 0.170 in. to 0.200 in., and most preferably having a diameter of about 0.188 in.

A filter paper or similar mechanism for filtering the air entering and leaving cage 1, 2 can be placed on shelf base 1160, preferably substantially covering the entire perforated area 1161. Most preferred filtration mechanism would be a sheet of filter paper covering the entire area of shelf base 1160, ensuring that all air entering and exiting cage 1, 2 travel through the filter paper. Alternatively, the filter paper can be a variety of sizes, for example, suitable for each perforated area, section, etc., as a matter of application specific to design choice.

Referring to FIG. 16, it is preferred to have a relatively small gap between the top of cage 1, 2 and the bottom of shelf bottom 1160. Preferably, the top of cage 1, 2 is substantially close to shelf bottom 1160 having apertures 1162 and covered by a filter paper, thereby substantially eliminating the need for a lid, for example, a lid having a filtration mechanism, on cage 1, 2, while allowing for the beneficial flow of air into, and out of the cage. Simultaneously, the distance G between shelf bottom 1160 and the top of cage 1, 2 is preferably sufficiently large to facilitate insertion and removal of cage 1, 2. The preferred distance G between the top of cage 1, 2 and shelf bottom is in the range of 0.100 in to 0.200 in, and most preferably about 0.125 in.

Also adding to the facilitation of air flow in and out of a cage in a lower shelf can be a gap H between shelf base 1160 and runner 1120, 1150, 1300, upon which a cage rests on an upper shelf. A preferred embodiment of the invention is depicted in FIG. 16, which shows gap I between the top of cage 2 and the bottom of cages 1, wherein cage 2 is on a first shelf 1410 and cages 1 are on a second shelf 1420, and first shelf 1410 is directly below second shelf 1420. Preferably, cages 1, 2 rest on flanges 1122, 1132, 1302, 1303 of runners 1120, 1130, 1300. Accordingly, the area between the bottom of cages 1, 2 are empty, thereby permitting air to enter and leave any cage located on a shelf underneath. Preferably, front and rear panels 1101, 1102 have a height sufficient to permit air to flow relatively easily to and from cages 1, 2. The most preferred height of front and rear panels 1101, 1102 is approximately 2 in.

Thus, a ventilated cage and rack system has been described having shelves that can facilitate placement of wide and/or narrow cages on the shelves while still maintaining proper air flow into and out of the cages, as well as maintaining proper air flow from the ambient room environment over the top of the cages. By employing the invention, lab personnel may combine both wide and narrow cages within the same rack, thus saving time and space by not having to rely on two separate racks if the use of different sized cages is desired. Additionally, a rack system constructed in accordance with the invention substantially eliminates the need for cage tops, thus reducing manufacturing costs and minimizing the need for storage space for components.

Pivoting runner 1300, end runner 1120 and section runner 1130 in accordance with the invention can further comprise a stabilizing element 1170, such as a spring mechanism for retaining the shape of runners 1120, 1130, 1300 which can help stabilize cage 1, 2 by applying a relatively low pressure on the lower side walls of cage 1, 2 when cage 1, 2 rests on runners 1120, 1130, 1300. Similar to the button described above in accordance with the embodiment of fixed runner 200 shown in FIG. 7, stabilizing element 1170 can maintain cage 1, 2 in position and substantially prevent unwanted movement of cage 1, 2.

In addition, while pivoting runners 300, 1300 have been described herein as pivoting runners that rotate about a pivot point, in certain embodiments of the invention, pivoting runners 300, 1300 need not pivot about a point, but only need be movable into at least a first position and a second position, such that both relatively narrow and relatively wide cages may be placed onto and beneficially facilitated by the shelf assembly 100, 1100. Accordingly, in certain embodiments, pivoting runner 300, 1300 may be designed such that, by way of non-limiting example, it may be slid into a first or second position, or alternatively, could be removed from the rack altogether.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, whereas a double-sided rack system has been discussed, it is understood that a single sided rack system can be constructed in accordance with the invention as a matter of application specific to design choice. Additionally, a rack system may comprise section beams to provide additional support without deviating from the scope of the invention. The rack system may also receive three or more different widths of cages, rather than two widths, as illustrated and described herein, without deviating from the scope of the invention. Alternatively, the rack system may comprise a plurality of pivoting runner between two fixed runners. For example, a shelf can comprise two fixed runners, one on either end, and a plurality of pivoting runners in between, thereby making the shelf easily adaptable to house a variety of cages having various widths. Furthermore, a rack system can include an air filtration system for drawing air from and/or pushing air into the cages without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A rack assembly for housing cages, the rack comprising:
   at least one shelf, the shelf having a shelf section comprising a first fixed runner and a second fixed runner and at least one pivotable runner being pivotally mounted between the first and second fixed runners;
   the pivotable runner being pivotable between a first position and a second position;
   wherein the pivotable runner in a first position divides the shelf section into a first shelf width between the first fixed runner and the pivotable runner and a second shelf width between the second fixed runner and the pivotable runner,
   the first fixed runner having a first support flange extending toward the pivotable runner;

the second fixed runner having a second support flange extending toward the pivotable runner;

the pivotable runner having a first flange extending toward the first fixed runner and a second flange extending toward the second fixed runner when the pivotable runner is in the first position, the first flange extending toward the second fixed runner and the second flange extending toward the first fixed runner when the pivotable runner is in the second position;

wherein the first flange of the pivotable runner and the first support flange of the first fixed runner are constructed and arranged to support a cage having a first cage width thereon when the pivotable runner is in the first position;

wherein the second flange of the pivotable runner and the second support flange of the second fixed runner are constructed and arranged to support a cage having a second cage width thereon when the pivotable runner is in the first position;

wherein the first support flange of the first fixed runner and the second support flange of the second fixed runner are constructed and arranged to support a cage having a third cage width thereon when the pivotable runner is in the second position, the third cage width being greater than the first cage width and the second cage width.

2. The rack assembly of claim 1, wherein the first shelf width is equal to the second shelf width.

3. A rack system for housing cages, the system comprising:
a rack having at least one shelf, the shelf having at least one pivotable runner being pivotally mounted, having a dividing portion connected to a first flange at a first side and a second flange at a second side, both the first flange and the second flange extending away from the dividing portion in opposite directions, the position of the first flange being fixed with respect to the second flange;

the pivotable runner being pivotable between a first position and a second position with respect to the shelf when the pivotable runner is mounted thereon;

wherein the shelf has a first state when the pivotable runner is in a first position, wherein the shelf includes one or more first shelf widths, the shelf accommodating one or more of a first cage having a first width when the shelf is in the first state, the shelf having a second state when the pivotable runner is in the second position, wherein the shelf includes one or more second shelf widths being less than the first shelf widths, the shelf accommodating one or more of a second cage having a second width when the shelf is in the second state, the second width being less than the first width.

4. The rack system of claim 3, wherein the shelf further comprises at least one fixed runner.

5. The rack system of claim 3, wherein the rack system comprises at least a first shelf and a second shelf, wherein the first shelf is located above the second shelf.

6. The rack system of claim 4, wherein the fixed runner comprises at least one flange.

7. The rack system of claim 3, wherein the flange of at least two pivotable runners include a support surface suitable for supporting at least one cage thereon.

8. The rack system of claim 6, wherein the flange of at least two fixed runners include a support surface suitable for supporting at least one cage thereon.

9. The rack system of claim 4, wherein the pivotable runner comprises at least one flange, and the fixed runner comprises at least one flange; wherein the flange of the pivotable runner and the flange of the fixed runner include a support surface suitable for supporting at least one cage thereon.

10. The rack system of claim 3, wherein the shelf further comprises a shelf base.

11. The rack system of claim 10, wherein the shelf base comprises at least one aperture.

12. The rack system of claim 10, wherein the shelf base comprises at least one perforated area having a plurality of apertures.

13. The rack system of claim 10, further including a gap between the shelf base and the pivotable flange.

14. The rack system of claim 3, wherein the shelf comprises at least one support runner for supporting the pivotable runner.

15. The rack system of claim 14, wherein the support runner comprises at least one flange.

16. The rack system of claim 15, wherein the flange of the support runner includes a stopping surface which contacts the pivotable runner when the pivotable runner reaches a predetermined position, wherein the stopping surface obstructs the pivotable runner from pivoting in a first direction beyond the predetermined position.

17. The rack system of claim 16, wherein the support runner comprises a flange having a notch.

18. The rack system of claim 3, wherein the pivotable runner pivots about a rod.

19. The rack system of claim 3, wherein the pivotable runner pivots about a protrusion.

20. The rack system of claim 3, wherein the shelf comprises at least one shelf face.

21. The rack system of claim 20, wherein the shelf face comprises a flange having a stopping surface which contacts the pivotable runner when the pivotable runner reaches a predetermined position, wherein the stopping surface obstructs the pivotable runner from pivoting in a first direction beyond the predetermined position.

22. The rack system of claim 20, wherein the shelf face comprises a flange having a notch.

23. The rack system of claim 20, wherein the shelf face comprises an aperture for receiving a protrusion; wherein the pivotable runner pivots about the protrusion.

24. The rack system of claim 20, wherein the shelf face comprises a stopper; wherein the stopper limits the motion of the pivotable runner.

25. The rack system of claim 24, wherein the stopper comprises a bolt and fastener, the fastener having a stopping surface which contacts the pivotable runner when the pivotable runner reaches a predetermined position, wherein the stopping surface obstructs the pivotable runner from pivoting beyond the predetermined position.

26. The rack system of claim 3, wherein the pivotable runner comprises a lateral reinforcement.

27. The rack system of claim 4, wherein the fixed runner comprises a slot.

28. The rack system of claim 4, wherein the fixed runner comprises a fastener.

29. The rack system of claim 4, wherein the fixed runner comprises an aperture.

30. The rack system of claim 4, wherein the fixed runner comprises an aperture constructed and arranged to receive a button.

31. A rack system for housing cages having different widths, the system comprising:
at least one shelf comprising:
at least one pivotable runner being pivotally mounted having a dividing portion connected to a first flange at a first side and a second flange at a second side, both the first flange and the second flange extending away from the dividing portion in opposite directions, the position of the first flange being fixed with respect to the second flange;
at least one fixed runner;
a shelf base comprising at least one perforated area having a plurality of apertures;
at least one support runner having a support flange;
at least one shelf face having a shelf flange; and
wherein the pivotable runner pivots in a first direction to a first position to adapt the shelf to support for a cage having a first width, and in a second direction to a second position to adapt the shelf to support a cage having a second width, the second width being greater than the first width,
wherein the shelf has a first shelf width when the pivotable runner is in the first position and a second shelf width when the pivotable runner is in the second position, the second shelf width being greater than the first shelf width.

32. The rack assembly of claim 3, comprising a double sided rack having at least one shelf on a front side and at least one shelf on a rear side of the doubled sided rack.

33. The rack assembly of claim 3, wherein the dividing portion extends upward with respect to the shelf when the pivotable runner is in the first position and downward with respect to the shelf when the pivotable runner is in the second position.

34. The rack assembly of claim 3, wherein the pivotable runner is rotated 180 degrees between the first position and the second position.

35. The rack system of claim 4, wherein the at least one fixed runner further includes a stabilizing element.

36. The rack system of claim 3, wherein the at least one pivotable runner further includes a stabilizing element.

37. The rack system of claim 1, wherein the pivotable runner further includes a stabilizing element.

38. The rack system of claim 1, wherein the first fixed runner further includes a stabilizing element.

39. The rack system of claim 1, wherein the second fixed runner further includes a stabilizing element.

40. The rack system of claim 31, wherein the at least one fixed runner further includes a stabilizing element.

41. The rack system of claim 31, wherein the at least one pivotable runner further includes a stabilizing element.

* * * * *